US012726489B2

(12) United States Patent
Lee et al.

(10) Patent No.: US 12,726,489 B2
(45) Date of Patent: Sep. 1, 2026

(54) ATTACK RISK ASSESSMENT SYSTEM OF AN ADVANCED PERSISTENT THREAT AND THE OPERATION METHOD

(71) Applicant: AJOU UNIVERSITY INDUSTRY—ACADEMIC COOPERATION FOUNDATION, Suwon-si (KR)

(72) Inventors: Seok Won Lee, Suwon-si (KR); Sihn Hye Park, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 199 days.

(21) Appl. No.: 18/074,919

(22) Filed: Dec. 5, 2022

(65) Prior Publication Data

US 2023/0179608 A1 Jun. 8, 2023

(30) Foreign Application Priority Data

Dec. 3, 2021 (KR) ........................ 10-2021-0171952

(51) Int. Cl.
*H04L 9/40* (2022.01)

(52) U.S. Cl.
CPC ...... *H04L 63/1416* (2013.01); *H04L 63/1433* (2013.01)

(58) Field of Classification Search
CPC ............. H04L 63/1416; H04L 63/1433; G06F 21/577; G06F 21/55; G06F 16/367
See application file for complete search history.

(56) References Cited

U.S. PATENT DOCUMENTS 6,895,383 B2 * 5/2005 Heinrich ............ G06Q 10/0635 705/1.1
9,330,262 B2 * 5/2016 Salehie ................... G06F 21/50
(Continued)

FOREIGN PATENT DOCUMENTS

CN 107172022 A * 9/2017 ......... H04L 63/1425
CN 112131882 A * 12/2020 ............. G06N 3/045
(Continued)

OTHER PUBLICATIONS

Kim, Bong-Jae, "Understanding and recommending security requirements from problem domain ontology: a three-layered approach" (Master's thesis), The Graduate School, Ajou University (2016) Retrieved from: https://dspace.ajou.ac.kr/handle/2018.oak/13305.

*Primary Examiner* — Lynn D Feild
*Assistant Examiner* — Abdullah Almamun
(74) *Attorney, Agent, or Firm* — Bridgeway IP Law Group, PLLC; Sang Ho Lee; Hyun Woo Shin

(57) ABSTRACT

Provided is an operation method of an attack risk assessment system, which includes: extracting, when an advanced persistent threat attack is detected, an attack component for the advanced persistent threat attack based on risk-aware problem domain ontology for assessing a security risk for an attack; identifying a risk component based on the attack component; deriving a security requirement by a goal based access scheme set for the risk component; and assessing the security risk based on an evidence set through a relationship between a domain asset identified as the risk component and the security requirement.

9 Claims, 4 Drawing Sheets

(56) References Cited

U.S. PATENT DOCUMENTS 9,530,016 B1 * 12/2016 Pomerantz ............ G06F 21/566
11,146,583 B2 * 10/2021 Nhlabatsi ............ H04L 63/1441
11,347,843 B2 * 5/2022 Suwad .................... G06F 21/52
11,397,808 B1 * 7/2022 Prabhu .................. G06F 21/566
11,683,333 B1 * 6/2023 Dominessy ........... H04L 43/045 726/25
11,722,522 B2 * 8/2023 Pandurangi ............. H04L 63/20
2007/0067845 A1 * 3/2007 Wiemer .............. H04L 63/1433 726/25
2014/0090071 A1 * 3/2014 Salehie ................... G06F 21/55 726/25
2014/0108089 A1 * 4/2014 Abercrombie ......... G06Q 10/04 705/7.28
2014/0380485 A1 * 12/2014 Ayyagari .............. G06F 21/577 726/25
2016/0036838 A1 * 2/2016 Jain ..................... H04L 63/1416 726/23
2016/0132896 A1 * 5/2016 Guerin ................. G06Q 30/018 705/317
2017/0235848 A1 * 8/2017 Van Dusen ............ G06Q 10/10 705/12
2017/0351980 A1 * 12/2017 Binder .................... G06F 16/86
2019/0306719 A1 * 10/2019 Chari .................. H04L 63/1425
2020/0050986 A1 * 2/2020 Vescio ................ H04L 63/1425
2020/0201989 A1 * 6/2020 Shu ....................... G06F 21/577
2020/0267186 A1 * 8/2020 Tarameshloo .......... H04L 63/20
2023/0132703 A1 * 5/2023 Marsenic ............ H04L 63/1433 726/25
2023/0222223 A1 * 7/2023 Lahmadi ............. H04L 63/1433 726/25
2023/0231871 A1 * 7/2023 Jiao ..................... H04L 63/1441 726/23

FOREIGN PATENT DOCUMENTS

CN 113364766 A * 9/2021 ......... H04L 63/1433
HU 227652 B1 * 10/2011
KR 10-2007-0061009 A 6/2007
KR 10-1511832 B1 4/2015
KR 10-2021-0064857 A 6/2021

* cited by examiner

| Components | Elements | Description |
|---|---|---|
| Attack Components | Attack Groups | Group name performing attack |
| | Attack Types | Attack type (e.g.) APT DDoS, Ransomware |
| | Attack Campaigns | Attack activity name (e.g.) operation wilted tulip |
| | Attack goal | Attack goal |
| | Targets | Attack target |
| | Cyber Kill Chain | Attack performing step |
| | Tactics | Tactics used for attack |
| | Software | Software used for attack |
| | Techniques | Technique used for attack |
| | Attack Patterns | Attack pattern |
| Risk Components | Threats | Security threat reflecting attack information |
| | Assets | Asset influenced by attack |
| | Risks | Risk for attack |
| | Security Measures | Asset security countermeasure for attack |
| | Weaknesses/Vulnerabillities | Security weakness or vulnerability of related asset |
| | Evidence | Security requirement meeting degree of related asset |
| Security Requirements Components | Malicious Goals | Malicious goal for threat |
| | Security Goals | Asset security goal for threat |
| | Security Requirements | Asset security requirement |
| Domain Components | Domain Assets | Security target domain asset |

FIG. 2

| Level of Satisfaction | Description | Degree of risk |
|---|---|---|
| High Satisfied | Method satisfying security requirement is implemented to correspond to achieving security goal involved in security requirement and defending malicious goal 90% or more | 0.25 |
| Medium Satisfied | Method satisfying security requirement is implemented to correspond to achieving security goal involved in security requirement and defending malicious goal 60% or more | 0.50 |
| Low Satisfied | Method satisfying security requirement is implemented to correspond to achieving security goal involved in security requirement and defending malicious goal 30% or more | 0.75 |
| Not Satisfied | Method satisfying security requirement is not implemented | 1.00 |

FIG. 3

ATTACK RISK ASSESSMENT SYSTEM OF AN ADVANCED PERSISTENT THREAT AND THE OPERATION METHOD

CROSS-REFERENCE TO RELATED APPLICATIONS

This application claims the priority of Korean Patent Application No. 10-2021-0171952 filed on Dec. 3, 2021, in the Korean Intellectual Property Office, the disclosure of which is incorporated herein by reference.

BACKGROUND

Field

The present disclosure relates to an attack risk assessment system of an advanced persistent threat and the operation method, and more particularly, to an attack risk assessment system of an advanced persistent threat and the operation method which easy to assess a security risk for an attack of an advanced persistent threat (APT).

Description of the Related Art

Today, cyber attacks, which exert a negative impact on the overall political and economic organization, are continuously evolving with changes in the IT environment, become more advanced and complex.

In particular, an Advanced Persistent Threat (hereinafter referred to as "APT") attack has a clear attack goal and a clear purpose for a determined attack target, and uses complex strategies and tactics from various perspectives as well as technology.

In order to preemptively defend this complex and evolving attack, a comprehensive and systematic understanding of the APT attack and risk assessment on assets in a domain are important.

In general, as one of the methods of protecting from potential cyber attacks, most organizations perform asset-oriented risk assessments to improve a security level of an information system.

The method of assessing risks centered on assets is a traditional risk assessment method used to establish a corporate information security system, and the risk may be assessed and a countermeasure may be determined through identifying the asset which is the corporate security target, importance assessment, vulnerability identification, threat analysis, and a process of calculating a threat occurrence possibility and an influence level upon occurrence of the threat.

That is, in this method of conducting individual risk-related activities for each important asset in the organization and assessing the risk after the result is integrated, since a task of enumerating all important assets associated with a corporate business is first started, a process in which an asset analysis range is very wide and a scale is large, and asset assessment is performed through various types of information scattered in an experience of a person in charge, an interview, a survey, a document, etc., and a security risk is analyzed and assessed such as analysis of vulnerabilities and threats therefor are very complex and repeated.

Asset centered risk assessment is an important risk assessment method of analyzing the risk for the important asset which should be protected in the organization, assessing an information security level, and establishing a security policy, but vast analysis for the vulnerability and the threat for each asset is performed, so time and cost problems for quickly handling a threat environment which is rapidly evolved may arise, and risk elements of complex attacks performed through various tactics and technologies on various assets through various steps such as the APT attack may be omitted and disregarded, and as a result, effective risk assessment and handling are difficult. It is important to assess the security risk based on a comprehensive and systematic understanding for the attack in order to defend the complex and evolving attack.

In recent years, a method for analyzing and assessing the security risk for the APT attack in various viewpoints has been researched.

SUMMARY

An object to be achieved by the present disclosure is to provide an attack risk assessment system of an advanced persistent threat and the operation method which easy to assess a security risk for an attack of an advanced persistent threat (APT).

The objects of the present disclosure are not limited to the above-mentioned objects, and other objects and advantages of the present disclosure that are not mentioned may be understood by the following description, and will be more clearly understood by exemplary embodiments of the present disclosure. Further, it will be readily appreciated that the objects and advantages of the present disclosure may be realized by means and combinations shown in the claims.

According to the present disclosure, an operation method of an attack risk assessment system may include: extracting, when an advanced persistent threat attack is detected, an attack component for the advanced persistent threat attack based on risk-aware problem domain ontology for assessing a security risk for an attack; identifying a risk component based on the attack component; deriving a security requirement by a goal based access scheme set for the risk component; and assessing the security risk based on an evidence set through a relationship between a domain asset identified as the risk component and the security requirement.

In the extracting of the attack component, the attack component may be extracted by applying the advanced persistent threat attack to an attack component model included in the risk-aware problem domain ontology.

In the identifying of the risk component, a threat element of the risk component where a security weakness or a vulnerability occurs may be identified by applying an attack element of the attack component to a risk component model included in the risk-aware problem domain ontology.

In the deriving of the security requirement, the security requirement may be derived which meets the goal based access scheme through a malicious goal and a security goal by applying the threat element of the risk component to a security requirement component model included in the risk-aware problem domain ontology.

The assessing of the security risk may include identifying a domain asset by applying the risk component to a domain component model included in the risk-aware problem domain ontology, and completing assessment of information of the security risk by assessing the relationship between the security requirement and the domain asset based on information specified in the evidence.

The operation method of an attack risk assessment system may further include, after the assessing of the security risk, storing the attack component, the risk component, the security requirement, and an assessment result of the security risk.

According to the present disclosure, an attack risk assessment system may include: an ontology server storing risk-aware problem domain ontology specified to security risk assessment for an advanced persistent threat attack; a database server providing information on advanced persistent threat attacks; and an attack risk assessment apparatus extracting, when an advanced persistent threat attack is detected, an attack component for the advanced persistent threat attack based on the risk-aware problem domain ontology, identifying a risk component corresponding to the attack component, and assessing a security risk according to a security requirement corresponding to the risk component.

The risk-aware problem domain ontology may include an attack component model, a risk component model, a security requirement component model, and a domain component model to assess risk assessment for the advanced persistent threat attack.

The attack risk assessment apparatus may include an attack component extraction unit extracting the attack component analyzed by applying the advanced persistent threat attack to the attack component model, a risk element identification unit identifying a risk component according to the risk component and information stored in the database server by the attack component, a security requirement derivation unit deriving a security requirement which meets a malicious goal and a security goal by a goal based access scheme set by the risk component, a domain asset identification unit identifying a domain asset by applying the risk component to the domain component model, and a security risk assessment unit assessing the security risk based on an evidence set through a relationship between the security requirement and the domain asset.

The security risk assessment unit may store the attack component, the risk component, the security requirement, and an assessment result of the security risk in at least one of the ontology server and the database server.

An attack risk assessment system of an advanced persistent threat and the operation method according to the present disclosure has an advantage in that a security risk for attack characteristics of the advanced persistent threat can be analyzed and assessed based on an attack risk assessment framework of an advanced persistent threat (APT).

Further, an attack risk assessment system of an advanced persistent threat and the operation method according to the present disclosure has an advantage in that a preemptive predictive security handling can be prepared and implemented by conducting risk assessment for a predictable attack in addition to an attack of a specific advanced persistent threat.

Meanwhile, the effects of the present disclosure are not limited to the above-mentioned effects, and various effects can be included within the scope which is apparent to those skilled in the art from contents to be described below.

BRIEF DESCRIPTION OF THE DRAWINGS

The above and other aspects, features and other advantages of the present disclosure will be more clearly understood from the following detailed description taken in conjunction with the accompanying drawings, in which:

FIG. 2 is an exemplary diagram illustrating a component extracted by an attack component extraction unit illustrated in FIG. 1;

FIG. 3 is an exemplary diagram illustrating an assessment criterion set in a security risk assessment unit illustrated in FIG. 1.

DETAILED DESCRIPTION OF THE PREFERRED EMBODIMENT

Figure 1:
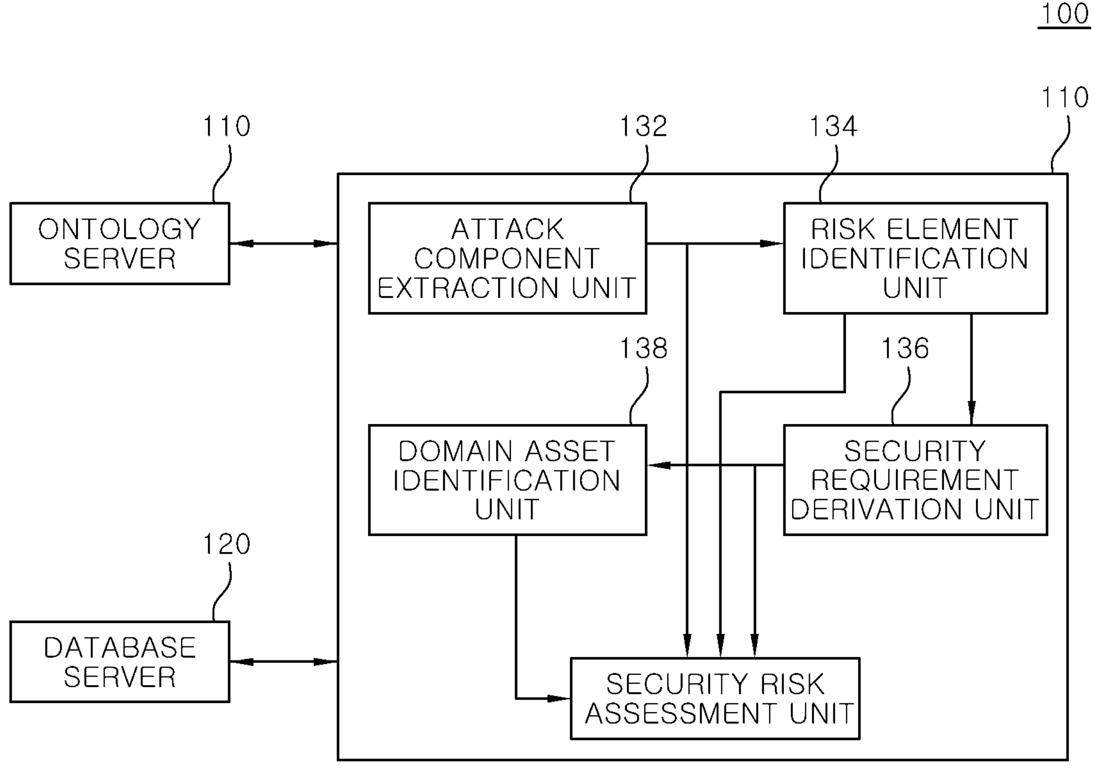
FIG. 1 is a system block diagram for an attack risk assessment system of an advanced persistent threat according to the present disclosure.

The present disclosure may be variously modified and have various embodiments and specific exemplary embodiments will be described in detail with reference to drawings. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one element from another element. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present disclosure. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Throughout the specification and claims, unless explicitly described to the contrary, a case where any part "includes" any component will be understood to imply the inclusion of stated components but not the exclusion of any other component.

Hereinafter, a preferred embodiment of the present disclosure will be described in detail with reference to the accompanying drawings.

FIG. 1 is a system block diagram for an attack risk assessment system of an advanced persistent threat according to the present disclosure, FIG. 2 is an exemplary diagram illustrating a component extracted by an attack component extraction unit illustrated in FIG. 1, and FIG. 3 is an exemplary diagram illustrating an assessment criterion set in a security risk assessment unit illustrated in FIG. 1.

Referring to FIGS. 1 to 3, the attack risk assessment system 100 of an advanced persistent threat may include an ontology server 110, a database server 120, and an attack risk assessment apparatus 130.

The ontology server 110 may store risk-aware problem domain ontology specified to security risk assessment for an advanced persistent threat (hereinafter, referred to as "APT") attack.

Here, the risk-aware problem domain ontology may include a plurality of analysis models required for performing a risk assessment process for each step.

The plurality of analysis models may include an attack component model, a risk component model, a security requirement component model, and a domain component model, and will be described below in FIG. 2.

That is, the ontology server 110 may include the plurality of analysis models for APT attack patterns, and design and store the risk-aware problem domain ontology including domain specified knowledge ontology, APT case knowledge ontology, and general security knowledge ontology.

The database server 120 may include information on APT attacks, and use a public or commercial knowledge base and threat intelligences which manage the information on the APT attack.

That is, the database server 120 may store MITRE ATT&CK attack information, an attack pattern of CAPEC, a security weakness of CWE, and security vulnerability information of CVE which are globally-accessible knowledge bases storing attacker tactics and technologies that actually detect and analyze the APT attack, but is not limited thereto.

Further, the ontology server 110 and the database server 120 are described as separate components, but may be implemented as one integrated server, and are not limited thereto.

The attack threat assessment apparatus 130 may include an attack component extraction unit 132, a risk element identification unit 134, a security requirement derivation unit 136, a domain asset identification unit 138, and a security risk assessment unit 140.

The attack component extraction unit 132 may extract an attack component based on the risk-aware problem domain ontology in order to perform risk assessment for an input APT attack.

First, FIG. 2 illustrates an attack component model, a risk component model, a security requirement component model, and a domain component model.

Further, each of the attack component model, the risk component model, the security requirement component model, and the domain component model represents the attack component, i.e., elements, and a description of the attack element.

The attack component may be constituted by attack components including attack groups of the attack component, targets, attack goals, tactics, etc., and a relationship between the attack components as illustrated in FIG. 2.

For example, technologies may be mapped to software used by the attack group, and the technologies and the software may be used for the tactics performed to achieve the goal.

That is, the attack component extraction unit 132 may extract the attack component by applying the APT attack to the attack component model.

The risk element identification unit 134 may identify the risk component by reflecting the attack element of the attack component extracted by the attack component extraction unit 132.

That is, the risk element identification unit 134 may identify a threat element of the risk component where the security weakness or the vulnerability occurs by applying the attack element of the attack component to the risk component model.

The security requirement derivation unit 136 may identify a malicious goal and a security goal in the threat element identified by the risk element identification unit 134.

That is, the security requirement derivation unit 136 may derive a security requirement that meets a target based access scheme through the malicious goal and the security goal by applying the risk element to the security requirement component model.

Since the malicious goal and the security goal are verified in a threat mapped to the attack component including the tactics of the APT attack, the malicious goal and the security goal may be specified in terms of the tactics, but are not limited thereto.

The domain asset identification unit 138 may be mapped to the asset of the risk component, and may identify a domain asset influenced by the APT attack.

That is, the domain asset identification unit 138 may identify the domain asset by applying the asset of the risk component to the domain component model.

Since the domain assets are classified into 4-layer viewpoints constituted by business process, human, and technical and physical layers, the domain assets may be analyzed from various related viewpoints, but are not limited thereto.

Here, the business process layer may include intangible/tangible activity information performed by a corporate for a profit. The intangible/tangible activity information may include corporate management activities that produce services or products for customers.

The human layer may include personal information for a plurality of persons which engages in the corporate, and the personal information may include personal personnel information, a security degree, and an accessible computing device.

The technical layer may be knowledge technology for producing the product, and the knowledge technology may include a design technology, a manufacturing technology, and a facility technology for producing the product of the corporate.

The physical layer may include a computer, a production facility, a manufacturing facility, and a server used by the corporate.

The security risk assessment unit 140 may assess the security risk based on the attack component model, the risk component model, the security requirement component model, and the domain component model illustrated in FIG. 2 as the relationship between the security requirement derived by the security requirement derivation unit 136 and the domain asset identified by the domain asset identification unit 138.

Here, the security risk assessment unit 140 may calculate the degree of the security risk based on information specified in a predetermined evidence.

The evidence may include whether the asset meets the security requirement, a method for making the asset to meet the security requirement, a security goal achieving method, and a method for defending the malicious goal.

The security risk assessment unit 140 assesses the security risk based on a satisfaction of the domain asset for the security requirement, and the satisfaction indicates information that the domain asset meets the security requirement according to information provided by the evidence.

That is, FIG. 3 illustrates an assessment criterion, and in respect to the assessment criterion illustrated in FIG. 3, since the security requirement is specified in terms of the tactics, how many assets are influenced by the tactics used for achieving the goal in the APT attack and the assets are considered in multiple viewpoints, so it may be assessed how the ATP attack is dangerous in business process, human, technical, and physical aspects and it may be assessed how high the organization is at risk of being attacked by the APT attack.

The security risk assessment unit 140 may store the evidence in the ontology server 110 after completing the assessment and reuse the stored evidence upon next risk assessment.

Figure 4:
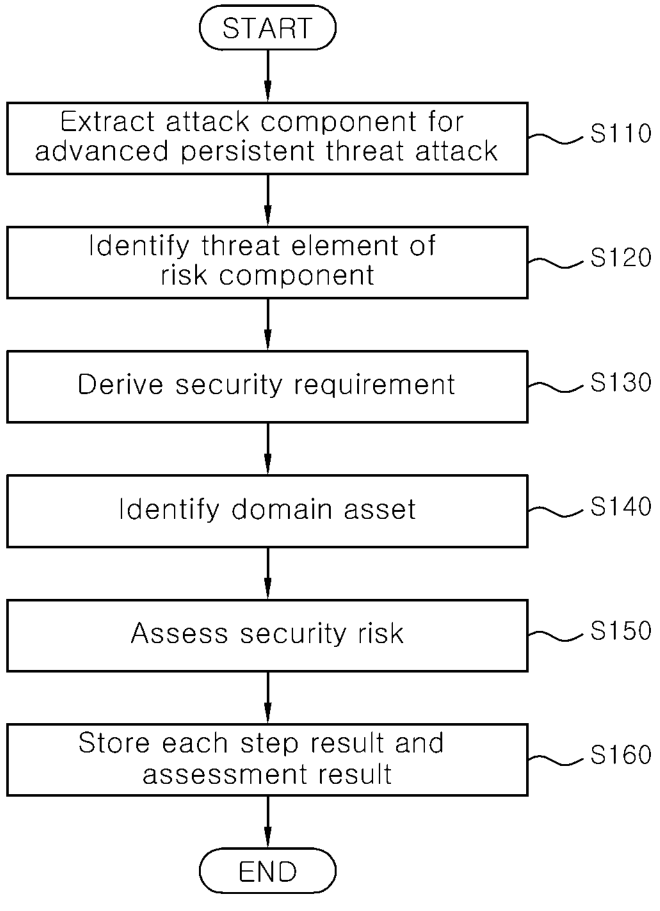
FIG. 4 is a flowchart illustrating an operation method of an attack risk assessment system of an advanced persistent threat according to the present disclosure.

FIG. 4 is a flowchart illustrating an operation method of an attack risk assessment system of an advanced persistent threat according to the present disclosure.

Referring to FIG. 4, the attack risk assessment apparatus 130 of the attack threat assessment system 100 may extract, when an advanced persistent threat attack is detected, an attack component for the advanced persistent threat attack by applying the detected advanced persistent threat attack to the attack component model included in the risk-aware problem domain ontology for assessing the security risk for the attack (S110).

That is, the attack component extraction unit 132 may extract the attack component based on the risk-aware problem domain ontology in order to perform risk assessment for an input APT attack.

The attack risk assessment apparatus 130 may identify a threat element of the risk component where the security weakness or the vulnerability occurs by applying the attack element of the attack component to the risk component model included in the risk-aware problem domain ontology (S120).

The attack risk assessment apparatus 130 may derive the security requirement which meets the goal based access scheme through the malicious goal and the security goal by applying the threat element of the risk component to the security requirement component model included in the risk-aware problem domain ontology (S130).

That is, the security requirement derivation unit 136 may derive a security requirement that meets a target based access scheme through the malicious goal and the security goal by applying the risk element to the security requirement component model.

Since the malicious goal and the security goal are verified in a threat mapped to the attack component including the tactics of the APT attack, the malicious goal and the security goal may be specified in terms of the tactics, but are not limited thereto.

The attack risk assessment apparatus 130 may identify the domain asset by applying the risk component to the domain component model included in the risk-aware problem domain ontology (S140).

That is, the domain asset identification unit 138 may identify the domain asset by applying the asset of the risk component to the domain component model.

Since the domain assets are classified into 4-layer viewpoints constituted by business process, human, and technical and physical layers, the domain assets may be analyzed from various related viewpoints, but are not limited thereto.

The attack risk assessment apparatus 130 may assess the security risk based on an evidence for setting the relationship between the domain asset identified by the risk component and the security requirement (S150).

The attack risk assessment apparatus 130 may store the attack component, the risk component, the security requirement, and an assessment result of the security risk when assessing the security risk is completed (S160).

That is, the security risk assessment unit 140 may assess the security risk based on the attack component model, the risk component model, the security requirement component model, and the domain component model illustrated in FIG. 2 as the relationship between the security requirement derived by the security requirement derivation unit 136 and the domain asset identified by the domain asset identification unit 138.

Here, the security risk assessment unit 140 may calculate the degree of the security risk based on information specified in a predetermined evidence.

The evidence may include whether the asset meets the security requirement, a method for making the asset to meet the security requirement, a security goal achieving method, and a method for defending the malicious goal.

The security risk assessment unit 140 assesses the security risk based on a satisfaction of the domain asset for the security requirement, and the satisfaction indicates information that the domain asset meets the security requirement according to information provided by the evidence.

Thereafter, the security risk assessment unit 140 may store the attack component, the risk component, the security requirement, and the assessment result of the security risk in at least one of the ontology server 110 and the database server 120 after completing the assessment.

Features, structures, effects, and the like described in the above exemplary embodiments are included in at least one embodiment of the present disclosure, and are not particularly limited to only one exemplary embodiment. Furthermore, features, structures, effects, and the like exemplified in each embodiment may be combined or modified for other exemplary embodiments those skilled in the art to which the exemplary embodiments pertain. Therefore, the contents related to such combinations and modifications should be interpreted as being included in the scope of the present disclosure.

The above description just illustrates the technical spirit of the present disclosure and various changes and modifications can be made by those skilled in the art to which the present disclosure pertains without departing from an essential characteristic of the present disclosure. Therefore, the embodiments of the present disclosure are provided for illustrative purposes only but not intended to limit the technical concept of the present disclosure. The scope of the technical concept of the present disclosure is not limited to the embodiment. The protective scope of the present disclosure should be construed based on the following claims, and all the technical concepts in the equivalent scope thereof should be construed as falling within the scope of the present disclosure.

What is claimed is:

1. An operation method of an attack risk assessment system, the operation method comprising:

extracting, by an attack component extraction processor, when an advanced persistent threat (APT) attack is detected, an attack component of the APT attack based on risk-aware problem domain ontology for assessing a security risk of an attack;

identifying, by a risk element identification processor, a risk component based on the attack component of the APT attack;

deriving, by a security requirement derivation processor, a security requirement corresponding to the risk component using a threat element of the risk component;

identifying, by a domain asset identification processor, specific domain asset influenced by the APT attack by using the risk component;

assessing, by a security risk assessment processor, the security risk by assessing a relationship between the specific domain asset and the security requirement based on predetermined evidence, to produce an assessment result of the security risk;

storing, by the security risk assessment processor, the attack component, the risk component, the security requirement, and the assessment result of the security risk in at least one of ontology server and database server; and utilizing the attack component, the risk component, the security requirement, and the assessment result of the security risk to defend the APT attack, wherein, in the assessing the security risk by assessing the relationship between the specific domain asset and the security requirement based on the predetermined evidence, a degree of the security risk is calculated based on a level of satisfaction of the specific domain asset for the security requirement according to information specified in the predetermined evidence, and the degree of security risk decreases as the level of satisfaction of the specific domain asset meeting the security requirement increases, wherein the predetermined evidence includes a degree of the specific domain asset meeting the security requirement, a method for making the specific domain asset to meet the security requirement, a method for achieving a security goal, and a method for defending against a malicious goal, wherein domain assets are classified into multiple viewpoints constituting a business process layer, a human layer, a technical layer, and a physical layer, wherein the attack component includes attack groups, targets, attack goals and tactics, and wherein the risk-aware problem domain ontology comprises a plurality of analysis models including an attack component model, a risk component model, a security requirement component model, and a domain component model, a plurality of ontologies including domain specified knowledge ontology, APT case knowledge ontology, and general security knowledge ontology.

2. The operation method of an attack risk assessment system of claim 1, wherein in the identifying of the risk component, the threat element of the risk component where a security weakness or a vulnerability occurs is identified by using an attack element of the attack component.

3. The operation method of an attack risk assessment system of claim 1, wherein the security requirement derived by the security requirement derivation processor meets a malicious goal and a security goal.

4. The operation method of claim 3, wherein the security requirement derivation processor identifies the malicious goal and the security goal in the risk component identified by the risk element identification processor.

5. The operation method of claim 1, wherein the business process layer includes information of intangible and tangible activities performed by a corporate, the intangible and tangible activities including corporate management activities that produce services or products for customers, the human layer includes personal information for a plurality of persons engaging in the corporate, the personal information including personal personnel information, a security degree, and an accessible computing device, the technical layer includes knowledge technology for producing a product, the knowledge technology including a design technology, a manufacturing technology, and a facility technology for producing the product of the corporate, and the physical layer includes a computer, a production facility, a manufacturing facility, and a server used by the corporate.

6. An attack risk assessment system comprising:

an ontology server configured to store risk-aware problem domain ontology specialized for security risk assessment against an advanced persistent threat (APT) attack;

a database server configured to provide information on the APT attack; and an attack risk assessment apparatus including:

an attack component extraction processor configured to extract an attack component of the APT attack based on the risk-aware problem domain ontology when the APT attack is detected, a risk element identification processor configured to identify a risk component based on the attack component of the APT attack and information stored in the database server, a security requirement derivation processor configured to derive a security requirement corresponding to the risk component and meeting a malicious goal and a security goal, a domain asset identification processor configured to identify specific domain asset influenced by the APT attack by using the risk component, and a security risk assessment processor configured to:

assess a security risk according to a relationship between the specific domain asset and the security requirement corresponding to the risk component based on predetermined evidence, to produce an assessment result of the security risk, calculate a degree of the security risk based on a level of satisfaction of the specific domain asset for the security requirement according to the information specified in the predetermined evidence, wherein the degree of security risk decreases as the level of satisfaction of the specific domain asset meeting the security requirement increases, store the attack component, the risk component, the security requirement, and the assessment result of the security risk in at least one of the ontology server and the database server, and utilize the attack component, the risk component, the security requirement, and the assessment result of the security risk to defend the APT attack, wherein the predetermined evidence includes a degree of the specific domain asset meeting the security requirement, a method for making the specific domain asset to meet the security requirement, a method for achieving the security goal, and a method for defending against the malicious goal, wherein domain assets are classified into multiple viewpoints constituting a business process layer, a human layer, a technical layer, and a physical layer, wherein the risk-aware problem domain ontology comprises a plurality of analysis models including an attack component model, a risk component model, a security requirement component model, and a domain component model, a plurality of ontologies including domain specified knowledge ontology, APT case knowledge ontology, and general security knowledge ontology, and wherein the attack component includes attack groups, targets, attack goals and tactics.

7. The attack risk assessment system of claim 6, wherein the business process layer includes information of intangible and tangible activities performed by a corporate, the intangible and tangible activities including corporate management activities that produce services or products for customers, the human layer includes personal information for a plurality of persons engaging in the corporate, the personal information including personal personnel information, a security degree, and an accessible computing device, the technical layer includes knowledge technology for producing a product, the knowledge technology including a design technology, a manufacturing technology, and a facility technology for producing the product of the corporate, and the physical layer includes a computer, a production facility, a manufacturing facility, and a server used by the corporate.

8. The attack risk assessment system of claim 6, wherein the security requirement derivation processor identifies the malicious goal and the security goal in the risk component identified by the risk element identification processor.

9. The attack risk assessment system of claim 6, wherein the database server uses public knowledge base and threat intelligence managing the information on the APT attack.

* * * * *